T. L. VALERIUS.
ICE CREAM FREEZER.
APPLICATION FILED JULY 28, 1906.
899,925.
Patented Sept. 29, 1908.
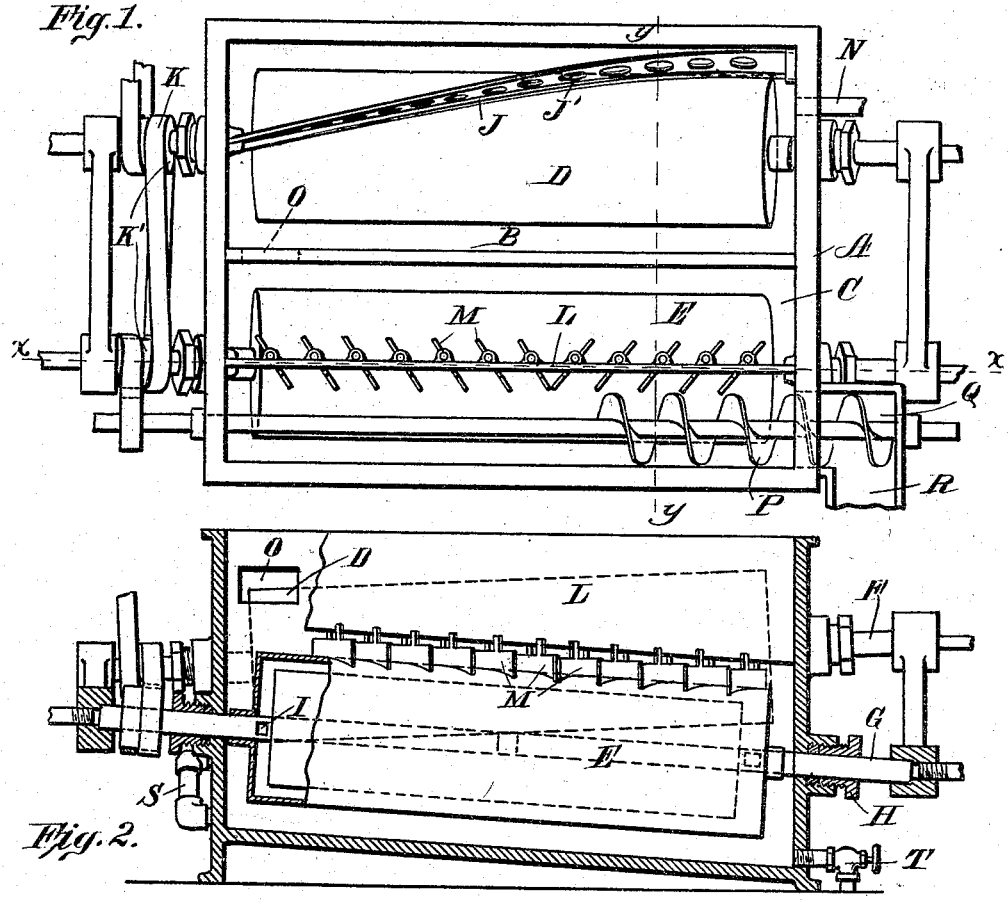
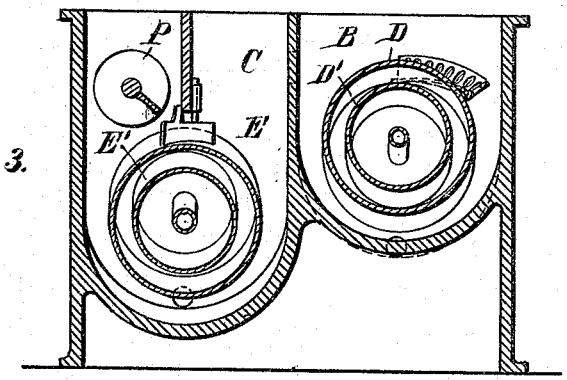
Witnesses:
Inventor:
Theodore L. Valerius,
by

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

No. 899,925.       Specification of Letters Patent.      Patented Sept. 29, 1908.

Application filed July 28, 1906. Serial No. 328,224.

*To all whom it may concern:*

Be it known that I, THEODORE L. VALERIUS, a citizen of Fort Atkinson, county of Jefferson, and State of Wisconsin, have invented a certain new, useful, and Improved Ice-Cream Freezer, of which the following is a full, clear, and exact description, such as will enable others skilled in the art to which it appertains to make and use the same.

My invention relates to the art of manufacturing ice cream and the like, and has special reference to improvements in ice cream freezers.

The primary object of my invention is to provide an apparatus, whereby liquid, such as ice cream custard may be reduced to a semi-frozen state, for subsequent refrigeration in suitable storage or packing vessels, and further to provide an apparatus whereby the process of manufacturing ice cream and the like may be carried on continuously.

Further and particular objects of my invention, as compared with such as are in present-day use, are: to reduce the cost of large capacity ice cream freezers, to lessen the labor of operating ice cream freezers, to provide a freezing apparatus which may be operated with less power than usual, to make it easier to maintain the apparatus in sanitary condition, and finally, to provide an ice cream freezer, the product of which shall be greatly increased in volume compared with the volume of the custard supplied to the machine.

My ice cream freezer, in its preferred form, comprises a trough-like receptacle open at the top, in combination with an internally cooled freezing cylinder, arranged for rotation within said trough; means for admitting the fluid to be frozen to one end of said trough, and means at the opposite end of said trough near the top thereof, for discharging the semi-frozen liquid therefrom.

My invention also includes novel scrapers which serve to clear said cylinder of frozen cream.

Further, my invention consists in an ice cream freezer comprising a freezer of the foregoing description, combined with a like freezer in such manner that the custard, or other liquid to be frozen, passes through both freezers before being discharged in a frozen state, the process begun in one freezer being completed in the other.

My invention also consists in various novel constructions and in combinations of parts, all as hereinafter described, and particularly pointed out in the claims.

The invention will be more readily understood by reference to the accompanying drawings forming a part of this specification, and in which Figure I is a plan view of an ice cream freezer embodying my invention. Fig. II is a vertical section thereof on the line X—X of Fig. I, the revoluble members being shown in full lines. Fig. III is a vertical, transverse section on the line Y—Y of Fig. I, viewed in the direction of the arrows.

The body of the ice cream freezer illustrated in the drawings contains two parallel troughs B and C, the latter being at a lower level than the former. The bottoms of these spaces or troughs are semi-cylindrical, and are inclined in opposite directions, as best represented in Figs. II and III. Within the troughs I arrange the refrigerating cylinders D and E, inclining the same to correspond with the bottoms of respective troughs. These cylinders are mounted upon hollow shafts F and G, borne in bearings at the ends of the troughs. The bearings are provided with stuffing boxes H to prevent leakage of liquid from the troughs. Each cylinder contains a smaller cylinder D', E'. The lower ends of the shafts F and G are connected with a source of freezing fluid such as a brine tank and pump (not shown), and the upper ends of said shafts are connected to the return pipe of the circulating system. The shafts F and G contain intermediately located plugs, (see dotted lines Fig. II), which prevent the direct flow of freezing fluid from end to end of the shafts, and said shafts contain openings I, which communicate with the annular space between the inner and outer cylinders, thus the freezing fluid which enters the lower end of one of the cylinders is caused to flow through said annular space before finding its escape through the opposite shaft opening, I. The purpose of the inner cylinder, (D', E'), is to compel the proper circulation of the freezing fluid, in other words, to prevent the establishment of direct currents between the openings I at the ends of the hollow shaft; the inner cylinder also limits the volume of the freezing fluid, and thereby lessens the weight of the freezing cylinder as a whole. The cylinders D and E are rotated within the troughs by means of a suitably driven belt K, operating over pulleys K' on the ends of the shafts F and G.

The trough B contains a suitable scraper J, preferably secured to the ends of the trough, and having its lower edge in close proximity to the surface of the cylinder D. This scraper, in order that it may possess adequate strength, is preferably made L-shaped in cross section, as indicated in Fig. III. Its office is to remove the surplus of frozen liquid from the surface of the cylinder D. To prevent its being too great an obstruction, to the liquid which is carried over by the rotating cylinder, the dasher is provided with large perforations, J'. A like scraper may be employed in connection with the cylinder E if desired, but I prefer to equip the cylinder E with a scraper of somewhat different form. In this case, the device comprises a partition portion L, and a plurality of pivoted scrapers M, the lower edges of which conform to the top of the cylinder E. The partition is held at the end of the trough. The scrapers M have short upright stems held by the partition L, and occupy diagonal positions with relation to the cylinder. Those above the upper end of the cylinder are usually adjusted as shown in Fig. I, in which positions they tend to deflect the liquid backwardly. The scrapers M above the lower end of the cylinder E are oppositely adjusted, to the end that they may assist in moving the then frozen liquid toward the end of the trough, to be there discharged from the trough. As the scrapers M are pivoted or swiveled upon the partition L, any desired disposition may be made thereof, either to retard or accelerate the movement of the liquid in the trough.

The liquid to be frozen, usually ice cream custard, is admitted to the upper end of the trough B, flowing in a continuous stream from the inlet pipe or spout N. After being partially frozen in the trough B, the liquid passes through the transfer opening or duct O, and falls into the upper end of the trough C. Here it is subjected to the action of the cylinder E and scrapers M, and finally is discharged at the opposite end of the trough. The discharge device which I prefer to employ comprises a revoluble screw conveyer P, located in the trough C, above the cylinder E. This conveyer is suitably driven (see Fig. I) and carries the frozen cream into the recess Q upon the end of the machine, from whence it is delivered to the packing can or mold, preferably by means of an inclined spout R, extending from the head or recess Q.

A valved by-pass S and a drain cock T are provided for the purpose of draining the machine when required. When placing the machine in operation, I preferably connect a steam pipe (not shown) with each of the cylinder shafts F and G, to the end that the cylinders may be warmed in case the cream cakes thereon, and also to supply steam for sterilizing the cylinders after the machine has been washed.

As various modifications of my invention will readily suggest themselves to one skilled in the art, I do not confine the invention to the specific structure herein shown and described.

Having thus described my invention, I claim as new, and desire to secure by Letters Patent—

1. In an ice cream freezer, a freezing vessel provided with liquid inlet and outlet at its top, in combination with a substantially horizontal freezing cylinder adapted for rotation within said vessel and suitable scraping means coacting with said cylinder, to remove the frozen liquid therefrom and return it to the vessel, said scraping means being adapted to direct the liquid toward the outlet opening of the vessel, substantially as described.

2. In an ice cream freezer, a freezing vessel, having an inclined bottom, in combination with means at the one end of said vessel for supplying liquid thereto, and at the other end for discharging frozen liquid therefrom, an axially inclined rotary cylinder provided in said vessel, means for circulating freezing fluid through said cylinder, and a suitable scraper coöperating with said cylinder, to agitate the freezing liquid in said vessel by freeing the semi-frozen liquid from said cylinder and returning it to the vessel substantially as described.

3. In an ice cream freezer, a trough-like freezing vessel, having an inclined bottom, in combination with an internally cooled rotary freezing cylinder correspondingly inclined within said vessel, cylinder scraping means coacting with the cylinder in the freezing operation, means for supplying liquid to one end of said vessel, and means at the other end, near the top thereof, for removing the semi-frozen liquid from the surface of the liquid in the vessel and for discharging the same from said vessel, substantially as described.

4. In an ice cream freezer, a freezing vessel open at the top and means for supplying liquid thereto, in combination with an internally cooled rotary cylinder occupying the lower part of said vessel, scraping means arranged about said cylinder to remove the semi-frozen liquid therefrom and return it to the vessel, a partition also arranged above the cylinder and substantially parallel with the axis thereof and suitably rotated frozen-liquid discharging means arranged above the cylinder, adjacent to said partition, in position to be partly submerged in the liquid in the vessel, substantially as described.

5. In an ice cream freezer, a freezing vessel, means for supplying liquid thereto, in combination with an internally cooled rotary cylinder in said vessel, adjustable cylinder scrapers coöperating with said cylinder in the freezing operation, and means at the top of the vessel for discharging the semi-frozen liquid from the end of the vessel, substantially as described.

6. In an ice cream freezer, a freezing vessel open to atmosphere and means for supplying liquid thereto, in combination with an internally cooled rotary cylinder arranged in the lower part of said vessel, a partition arranged above the said cylinder, a plurality of scrapers in substantial contact with the cylinder, and coöperating therewith in the freezing operation, said scrapers being adjustable and in their different positions adapted to retard and accelerate the movement of the liquid in the vessel and suitably driven rotary means for drawing the semi-frozen-liquid from the top of the vessel, substantially as described.

7. In an ice cream freezer, a freezing receptacle, and means for supplying liquid thereto, in combination with an internally cooled rotary cylinder in the lower part of said vessel, a partition above said cylinder, and means at the top of the vessel for discharging semi-frozen liquid therefrom, substantially as described.

8. In an ice cream freezer, a freezing receptacle, and means for supplying liquid thereto, in combination with an internally cooled rotary cylinder in the lower part of said vessel, a partition above said cylinder, a plurality of adjustable scrapers, and means at the top of the vessel for discharging semi-frozen liquid therefrom, substantially as described.

9. In an ice cream freezer, a freezing vessel, and means for supplying liquid thereto, in combination with an internally cooled rotary cylinder in the lower part of said vessel, a partition parallel with said cylinder, a plurality of adjustable scrapers thereon, and a rotary conveyer, occupying a horizontal position in the upper part of said vessel for withdrawing and discharging semi-frozen liquid therefrom, substantially as described.

10. In an ice cream freezer, two trough-like vessels, arranged upon different levels, and connected by a passage at the top, in combination with internally cooled rotary cylinders arranged in the bottoms of respective vessels, suitable scrapers coöperating with said cylinders, means for supplying liquid to the upper trough, and means at the top of the lower trough for discharging semi-frozen liquid therefrom, substantially as described.

11. In an ice cream freezer, two oppositely inclined trough-like vessels, arranged upon different levels, in combination with correspondingly inclined internally cooled rotary cylinders in said vessels, suitable scrapers coöperating with said cylinders, means for supplying liquid to the upper vessel, means near the top of the upper vessel for discharging partially frozen liquid therefrom into the lower vessel, and mechanism at the top of the lower vessel for discharging the frozen liquid therefrom, substantially as described.

12. In an ice cream freezer, two trough-like vessels arranged upon different levels, in combination with internally cooled rotary cylinders provided in said vessels, stationary scrapers coöperating with said cylinders, and arranged above the same, a partition above the cylinder in the lower vessel, a duct connecting the upper part of the upper trough with said lower trough, and means adjacent to said partition for discharging frozen liquid from said lower trough, substantially as described.

13. In an ice cream freezer, a trough-like vessel, in combination with an internally cooled freezing cylinder arranged for rotation within said vessel, a spirally arranged scraper in substantial contact with the top of said cylinder and coöperating therewith in the freezing operation, means for supplying liquid to said vessel, and means for discharging the frozen liquid therefrom, substantially as described.

14. In an ice cream freezer, a trough-like vessel open at the top, in combination with an internally cooled freezing cylinder arranged for rotation within said vessel, a spirally arranged scraper coöperating with said cylinder in the liquid agitating and freezing opreation, means at one end of said vessel for supplying liquid thereto, and means at the opposite end thereof for discharging liquid therefrom, substantially as described.

15. In an ice cream freezer, a trough-like vessel, in combination with an internally cooled freezing cylinder arranged for rotation in said vessel, a spirally arranged scraper above said cylinder for coöperation therewith, means for supplying liquid to said vessel, and means for discharging the frozen liquid therefrom, substantially as described.

16. In an ice cream freezer, a trough-like vessel, in combination with a freezing cylinder arranged for rotation within said vessel, means for circulating a cooling liquid in said cylinder, a spirally arranged scraper for coöperation with said cylinder, means for supplying liquid to said vessel and means for discharging the frozen liquid therefrom, substantially as described.

17. In an ice cream freezer, two trough-like vessels arranged upon different levels and connected by a passage at the top, in combination with internally cooled rotary cylinders arranged in the bottoms of respective vessels, a spirally arranged fixed scraper for coöperation with one of said cylinders, and adjustable scrapers coöperating with the other cylinder, means for supplying liquid to the upper trough, and means at the top of the lower trough for discharging the semi-frozen liquid therefrom, substantially as described.

18. In an ice cream freezer, a trough-li vessel, in combination with an internally cooled freezing cylinder arranged for rotation within said vessel, a partition above said cylinder, a plurality of scrapers pivoted upon said partition and coöperating with said cylinder, means for supplying liquid to said vessel, and means for discharging the frozen liquid therefrom, substantially as described.

19. In an ice cream freezer, a trough-like vessel, in combination with an internally cooled freezing cylinder arranged for rotation with said vessel, a partition above said cylinder, a plurality of scrapers pivoted to said partition upon horizontal axes and coöperating with said cylinder, means for supplying liquid to said vessel, and means for discharging the frozen liquid therefrom, substantially as described.

In testimony whereof, I have hereunto set my hand, this 25th day of July, 1906, in the presence of two subscribing witnesses.

THEODORE L. VALERIUS.

Witnesses:
IRVING R. HIPPENMEYER,
SANFORD P. STARKS.